March 31, 1931. H. A. WINTERMUTE ET AL 1,798,964
ELECTRICAL PRECIPITATION APPARATUS
Filed May 1, 1929 3 Sheets-Sheet 1

Inventors:
Harry A. Wintermute
Carl W. J. Hedberg
By Byrnes, Townsend & Bickenstein
Attorneys.

March 31, 1931. H. A. WINTERMUTE ET AL 1,798,964
ELECTRICAL PRECIPITATION APPARATUS
Filed May 1, 1929 3 Sheets-Sheet 2
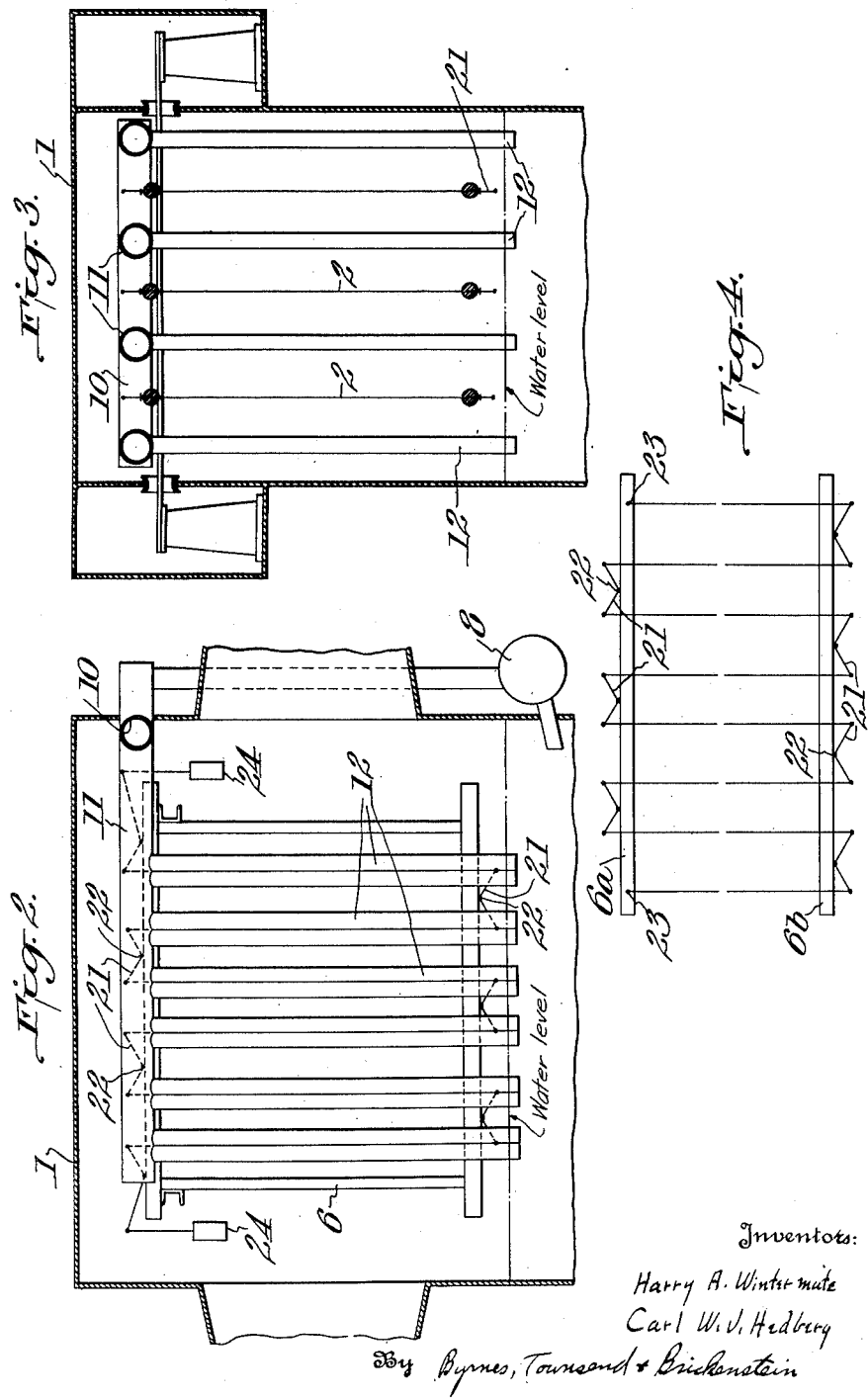
Inventors:
Harry A. Wintermute
Carl W. J. Hedberg
By Byrnes, Townsend & Brickenstein
Attorneys.

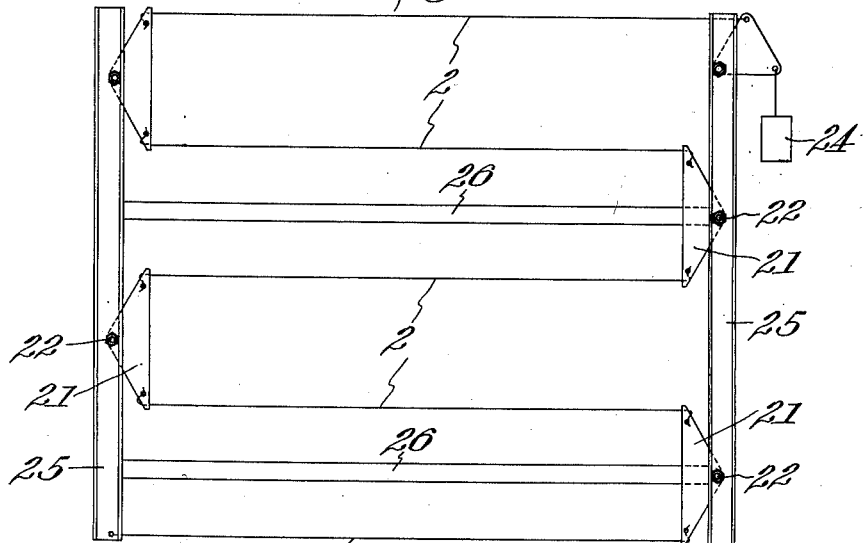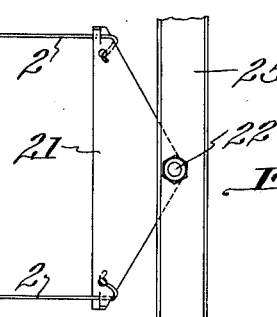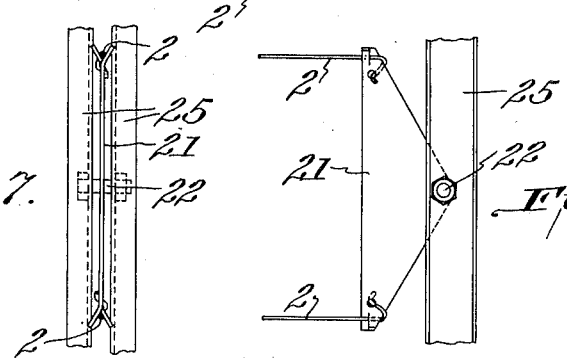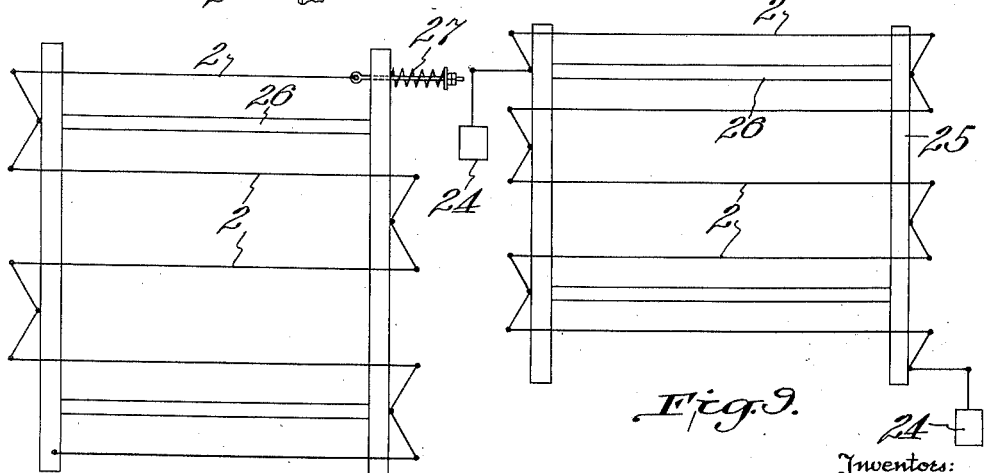

Patented Mar. 31, 1931

1,798,964

UNITED STATES PATENT OFFICE

HARRY A. WINTERMUTE, OF PLAINFIELD, AND CARL W. J. HEDBERG, OF MIDDLESEX, NEW JERSEY, ASSIGNORS TO RESEARCH CORPORATION, OF NEW YORK, N. Y., A CORPORATION OF NEW YORK

ELECTRICAL-PRECIPITATION APPARATUS

Application filed May 1, 1929. Serial No. 359,684.

This invention relates to the art of electrically precipitating suspended particles from gases, and while applicable to a number of dust cleaning problems, is primarily adapted for the removal of ash and other suspended matter from the gaseous products of combustion from boilers fired with powdered fuel. This problem involves the separation of large quantities of refuse material from great volumes of gas which vary widely in amount due to fluctuations in power loads. As much as possible is collected in a dry state to facilitate handling and removal. Furthermore it is desirable to maintain gas temperatures in order to provide sufficient stack draft and thereby reduce fan operating costs. This type of gas, moreover, may contain a certain percentage of sulfurous gases, so that the use of water in cleaning these gases must be controlled to minimize corrosion of metal parts of the apparatus.

In the use of electrical precipitators for steam plants of the kind described it has been found that there is a certain critical velocity above which effective precipitation falls off very rapidly, due largely to the presence in the combustion gases of grit and unconsumed coal which are not retained at the collecting electrode, as commonly used, but travel along its surface. This content of grit and combustible matter, as well as the volume of the gas, increases at peak loads, and the electrical precipitators must be designed to take care of the maximum or peak load conditions.

In order to take care of these conditions, we subject the gases first to the action of electrical precipitation conditions in the absence of flushing liquid, and then subject the gases from which the more finely divided particles have been removed, to further electrical precipitating conditions, including the use of liquid flushed collecting electrodes to thereby recover whatever suspended matter has escaped collection at the surface of the dry collecting electrodes. We contemplate the use of water as a flushing liquid, although it will be obvious that other flushing liquids may be used.

We are aware that it is not new to flush the surfaces of the collecting electrodes with water (see Burns Patent No. 1,250,088, Dec. 11, 1917), but under these conditions a sludge of water and precipitated material is formed, which is troublesome to handle. We have found that this sludge is caused principally by the mixture of water and the very fine suspended particles of the gas, whereas, in a mixture of water and coarser particles, no sludge is formed, the precipitated matter settling to the bottom of the container. According to our invention the bulk of the fine material is eliminated in a "dry" precipitator and the residual usually coarser material is collected in a "wet" precipitator, so arranged that the dfficulties above referred to are minimized.

While various types of flushed collecting electrodes may be used, we have found it preferable to use novel collecting electrodes of the kind hereinafter described. whereby many of the disadvantages of "wet" precipitators are obviated.

Due to the necessary use of pipes for conducting the flushing liquid to the "wet" collecting electrodes, the usual system of suspension of the discharge electrodes is not well adapted to the above-described structure and as part of this invention we have devised a novel supporting system for these electrodes. Although this system is particularly well adapted for use with a "wet" precipitator, it will be understood that it is not limited to use with a "wet" unit, but may be advantageously applied to any form of "dry" or "wet" unit. In this type of suspension, cleaning of the discharge electrodes is facilitated.

The invention will be understood from the accompanying drawings in which:

Fig. 2 is a longitudinal, and Fig. 3 a cross-section, through a "wet" precipitator showing the general arrangement of the electrodes;

Fig. 4 shows an alternative arrangement for the discharge electrodes;

Fig. 5 shows a slightly different supporting arrangement for the discharge electrodes, and used with a horizontal unit;

Figs. 6 and 7 are side and top elevations, respectively, of the supporting plate for the discharge electrodes;

Figs. 8 and 9 show modified arrangements of discharge electrodes used with horizontal units.

Figure 1:
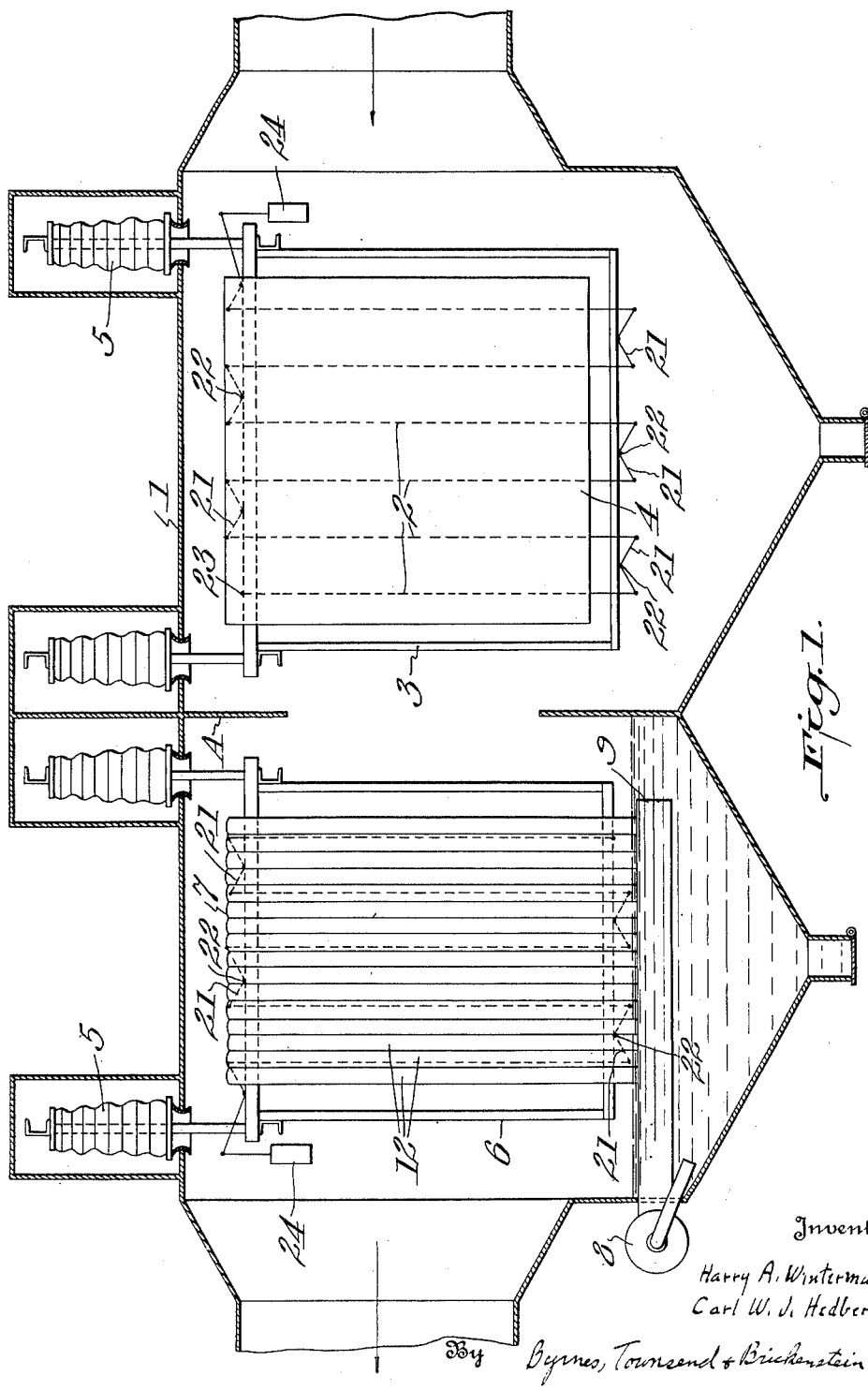
Fig. 1 is a diagrammatic elevation of an electrical precipitation system having both "dry" and "wet" sections.

Referring to Fig. 1, the gases from the furnaces pass through the chamber marked 1, which is divided into a dry section and a wet section, by a partition A. The dry section may be the well-known type of electrical precipitator comprising a series of discharge electrodes 2, mounted in a frame 3, supported on insulators 5, and located between collecting plate electrodes 4.

It will be noted, however, that the suspension for the discharge electrodes 2 is not of the conventional type but involves structural features which are particularly advantageous. The wires 2 are attached to rigid bell-crank members 21, said members being pivoted to the frame 3 at points 22. One end of the last electrode 2 is connected directly to the frame 3, as shown at 23, while one end of the first electrode is connected to a bell-crank supporting a weight 24. By this construction it will be seen that wire electrodes 2 are held taut by the weight 24.

In this section the bulk of the finely divided suspended material is precipitated from the hot gases and drops down into a hopper.

The hot gases then pass into the wet section, which has discharge electrodes mounted on the frame 6 and located between collecting electrodes 7, which may be of any suitable type such as flat or corrugated plates, but are here shown as made up of units 12, to be later described. These collecting electrodes are flushed with water, or other suitable liquid, by means of a pump 8 which delivers the liquid from the bottom of the section to a header 9, to which are connected the hollow units of the collecting electrode, the liquid passing upward through these hollow units, overflowing at the top, and then flowing down over the outside of the units.

The discharge electrodes of this wet section are suspended similarly to those of the dry section, this method of suspension being peculiarly advantageous in a wet section. As seen in Fig. 1, it is necessary for the main feed pipes 9, at the bottom, to be much larger than the vertical pipes 7 which form the collecting electrodes. If the water level is below these main feed pipes, it means that the discharge electrode wires must pass these pipes much closer than the normal gap between the discharge electrodes and the streams of water, which would, of course, result in heavy discharges at these points. By the construction as shown, the water level is above the main feed pipe 9, and lever arms 21 project toward the water level but properly spaced therefrom to avoid excessive arcing. An even tension is thus placed on all the discharge wires.

Another advantage particularly useful with a wet section is that corona discharge will take place from the sharp points at the bottom of the lever arms to the surface of the water, thus giving an effective precipitation along the water level. Sneakage of the gas along the surface of the water is thus eliminated and a high gas velocity may be maintained here also.

Another advantage of the lever-arm suspension of discharge wires, whether applied to wet or dry sections, is that the wires are prevented from swaying. When each discharge electrode is weighted it is necessary that each weight be very thin and wide, and these weights sway and twist due to the gas velocity and permit excessive arcing to the collecting electrodes.

In Figs. 2 and 3, the discharge electrodes are shown as suspended similarly to those of Fig. 1, except that a weight 24 is used at each end instead of fixing one end electrode directly to the frame.

In Fig. 4, the discharge electrodes are kept taut by the weight of the lower member 6b which with 6a takes the place of the rigid frame 6 of Figs. 1 and 2. In this arrangement no weights are used at the ends of the electrode wires, the wire ends being fastened to the supporting member 6a at 23.

In operation the stream of gases carrying ash, unconsumed coal particles and the like, flows through the dry section which is made of sufficient length to collect and precipitate the bulk of the suspended material in dry condition. The partially cleaned gas still at high temperature and velocity then passes through the wet section which need be only of sufficient length to collect and precipitate the coarser material which has passed the dry section. This material is washed down from the collecting electrodes, but because of its physical character does not form a sludge, but readily settles out from the water in the collecting tank, from which it may be removed by any suitable means.

The gas is not materially cooled in passing through the wet section since only the side portions of the stream are brought into contact with the water, nor is there any objectionable humidification.

The wet and dry precipitator sections may be connected to a common high tension system or each may be provided with its own source of electrical energy. The system provides additional flexibility as it may be found advantageous to operate such wet sections only at peak load periods when the gas volumes are much above the average.

By the combination described of dry and wet electrical precipitating sections in series or tandem relation, the suspended material in the gases is efficiently precipitated, while the draft conditions are not impaired. The finer particles, which would form a sludge if mixed with water, are recovered in dry condition, and the coarser ash and the like are washed down with water from which they settle without difficulty. This arrangement moreover insures effective precipitation from a gas stream moving at high velocity.

Referring to Fig. 5, there is shown a modification of the support for the high tension discharge electrodes as applied to a horizontal electrode section, wherein the bell-cranks 21 project inwardly from the frame 25, instead of outwardly, as in Fig. 1. The bell-cranks are here shown as triangular plates pivoted at 22, although it will be understood that the invention is not limited to the form which these bell-cranks may take. Rigid braces 26 hold frame 25 in its rectangular form.

Figs. 6 and 7 show details of mounting the discharge wires 2 to the triangular bell-cranks 21. The supporting frame 25 is shown as formed by two channels spaced apart to accommodate the plate 21. Wires 2 pass through a split corner of plate 21, are bent over and the ends passed through a hole in the plate, as clearly shown.

Figs. 8 and 9 show further modifications of the suspension as applied to horizontal electrodes, although it is clear that such modifications are equally applicable to vertical electrodes. In Fig. 8 a spring 27 is used to keep the tension on the system instead of a weight. In Fig. 9 two weights are shown, one at each end of the system. It will, of course, be understood that a weight at one end and a spring at the other could be used.

This system of suspension for the discharge electrodes allows them to be easily cleaned. It is only necessary to lift the weight (or both weights when two are used) and allow it to fall, thereby snapping the wires. This snap passes along the entire system to its fixed end and dislodges any accumulation of suspended material. In case a spring is used, as in Fig. 8, a mere pressure thereon and sudden release accomplishes the same result.

This application is a continuation-in-part of our application Serial No. 236,335, filed November 28, 1927, which matured into Patent No. 1,766,422 on June 24, 1930.

We claim:

1. In an electrical precipitator for the separation of suspended particles from gases, a plurality of parallel collecting electrodes defining a gas passage, a discharge electrode system intermediate the collecting electrodes and parallel thereto, said system comprising a rigid frame, a plurality of parallel discharge electrodes spaced apart and connected to said frame through yielding means, and a tensioning means operating through said yielding means to hold the discharge electrodes taut.

2. In an electrical precipitator for the separation of suspended particles from gases, a plurality of parallel collecting electrodes defining a gas passage, a discharge electrode system intermediate the collecting electrodes and parallel thereto, said system comprising parallel rigid carrying members, a plurality of parallel discharge electrodes spaced apart and connected to said members through yielding means, and a tensioning means operating through said yielding means to hold the discharge electrodes taut.

3. In an electrical precipitator for the separation of suspended particles from gases, a plurality of parallel collecting electrodes defining a gas passage, a discharge electrode system intermediate the collecting electrodes and parallel thereto, said system comprising parallel rigid carrying members, a plurality of parallel discharge electrodes spaced apart and connected to said members through triangular plates pivoted to said members, and a tensioning means operating through said plates to hold the discharge electrodes taut.

4. In an electrical precipitator for the separation of suspended particles from gases, a plurality of parallel collecting electrodes defining a gas passage, a discharge electrode system intermediate the collecting electrodes and parallel thereto, said system comprising parallel rigid carrying members, and a plurality of parallel wire discharge electrodes spaced apart and connected to one another and to the carrying members by means of triangular plates pivoted to said members, the wires being secured to said plates through slotted corners thereof.

In testimony whereof, we affix our signatures.

HARRY A. WINTERMUTE.
CARL W. J. HEDBERG.